(12) United States Patent
Gamberini (10) Patent No.: US 7,726,102 B2
(45) Date of Patent: Jun. 1, 2010

(54) METHOD AND MACHINE FOR FILLING CAPSULES OR SIMILAR WITH AT LEAST ONE PRODUCT, IN PARTICULAR A PHARMACEUTICAL PRODUCT IN GRANULES

(75) Inventor: Ernesto Gamberini, Rastignano (IT)

(73) Assignee: MG 2 -S.r.l., Pianoro (IT)

( * ) Notice: Subject to any disclaimer, the term of this patent is extended or adjusted under 35 U.S.C. 154(b) by 240 days.

(21) Appl. No.: 12/104,628

(22) Filed: Apr. 17, 2008

(65) Prior Publication Data

US 2008/0256906 A1    Oct. 23, 2008

(30) Foreign Application Priority Data

Apr. 19, 2007    (EP)    ................... 07425229

(51) Int. Cl.
*A61J 3/07*    (2006.01)
*B65B 1/32*    (2006.01)
*B65B 1/30*    (2006.01)

(52) U.S. Cl. ............................ 53/471; 53/473; 53/502; 53/253; 53/281; 53/900; 141/83

(58) Field of Classification Search .................. 53/247, 53/249, 250, 253, 281, 282, 473, 471, 502, 53/454, 560, 900; 141/83; 177/55, 58; *A61J 3/07; B65B 1/30, 1/32, 1/46*
See application file for complete search history.

(56) References Cited

U.S. PATENT DOCUMENTS 3,501,894 A * 3/1970 Hayashi et al. ............... 53/281
4,089,152 A * 5/1978 Zanasi ........................... 53/281
4,408,641 A * 10/1983 Yamamoto et al. ............. 141/82
4,431,070 A * 2/1984 Andrews ....................... 177/102
5,018,335 A * 5/1991 Yamamoto et al. ............. 53/281
5,340,949 A * 8/1994 Fujimura et al. ............... 141/83
5,515,740 A * 5/1996 Gamberini ................. 73/865.8
5,971,037 A * 10/1999 Ansaloni ....................... 141/83
6,837,280 B2 * 1/2005 Ragazzini et al. ............. 141/83
6,901,972 B1 * 6/2005 Nelson ......................... 141/67
7,536,843 B2 * 5/2009 Djurle et al. ................... 53/502
2005/0230000 A1* 10/2005 Gamberini .................... 141/83
2007/0144674 A1* 6/2007 Gamberini .................... 156/350
2007/0284015 A1* 12/2007 Ansaloni et al. ............. 141/129
2008/0127609 A1* 6/2008 Tagliavini et al. .............. 53/53
2008/0134629 A1* 6/2008 Schmied et al. ................ 53/55
2008/0256906 A1* 10/2008 Gamberini .................... 53/502
2008/0256908 A1* 10/2008 Frabetti ....................... 53/502

FOREIGN PATENT DOCUMENTS

| CH | 662993 A5 * | 11/1987 |
| JP | 06298201 A * | 10/1994 |
| JP | 06345189 A * | 12/1994 |
| WO | 03094824 | 11/2003 |
| WO | 2006035285 | 4/2006 |

* cited by examiner

*Primary Examiner*—Stephen F Gerrity
(74) *Attorney, Agent, or Firm*—Gottlieb, Rackman & Reisman (57) ABSTRACT

A method and machine for filling capsules with at least one product, whereby the bottom shell of each capsule is fed along a given path in time with a relative metering device having a metering chamber for transferring a given quantity of product from a tank into the bottom shell; the metering chamber having a weighing device for weighing the product contained in the metering chamber.

17 Claims, 8 Drawing Sheets

METHOD AND MACHINE FOR FILLING CAPSULES OR SIMILAR WITH AT LEAST ONE PRODUCT, IN PARTICULAR A PHARMACEUTICAL PRODUCT IN GRANULES

The present invention relates to a machine for filling capsules or similar with at least one product.

More specifically, the present invention relates to a machine for filling capsules with a pharmaceutical product in granules, to which the following description refers purely by way of example.

BACKGROUND OF THE INVENTION

In the pharmaceutical industry, a machine for filling capsules with a pharmaceutical product in granules is known comprising a conveyor device movable continuously along a given path and having a number of pockets, each for receiving a respective bottom shell of a capsule; at least one tank containing the product; and a metering wheel mounted to rotate continuously about its substantially vertical longitudinal axis.

The metering wheel has a number of metering devices, each of which travels with the metering wheel along a portion of the path of the bottom shells, in time with a respective bottom shell, to transfer a given quantity of product from the tank into the bottom shell.

Each metering device comprises a substantially cylindrical metering chamber for receiving the product from the tank; an unloading chute for unloading the product from the metering chamber into the relative bottom shell; and a piston, which defines the bottom of the metering chamber, and is moved along the metering chamber, by a cam follower roller engaging a cam associated with the metering wheel, to and from a feed position to feed the product to the unloading chute and, therefore, into the bottom shell.

Each pocket on the conveyor device is defined by a shaped bush with a capacitive transducer, which provides for weighing the respective empty bottom shell, weighing the respective bottom shell containing the product, and calculating the weight of the product in the respective bottom shell as the difference between the two weights.

Known machines of the type described above have various drawbacks, mainly due to the fact that, though amply tried and tested, the method used to calculate the weight of the product in each bottom shell fails to prevent a possible error in the weight of the bottom shell from impairing calculation of the weight of the product in the bottom shell, particularly in view of the high dielectric constant of the material of the bottom shell with respect to the dielectric constant of the product inside the bottom shell.

SUMMARY OF THE INVENTION

It is an object of the present invention to provide a machine for filling capsules or similar with at least one product, and designed to eliminate the aforementioned drawbacks.

According to the present invention, there is provided a machine for filling capsules or similar with at least one product, as claimed in the attached Claims.

The present invention also relates to a method of filling capsules or similar with at least one product.

According to the present invention, there is provided a method of filling capsules or similar with at least one product, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Number 1 in FIGS. 1 and 2a-2g indicates as a whole a machine for filling known capsules (not shown) with at least one pharmaceutical product in granules. Each capsule (not shown) comprises a substantially cup-shaped bottom shell 2, and a top shell (not shown) closing bottom shell 2.

Figure 1:
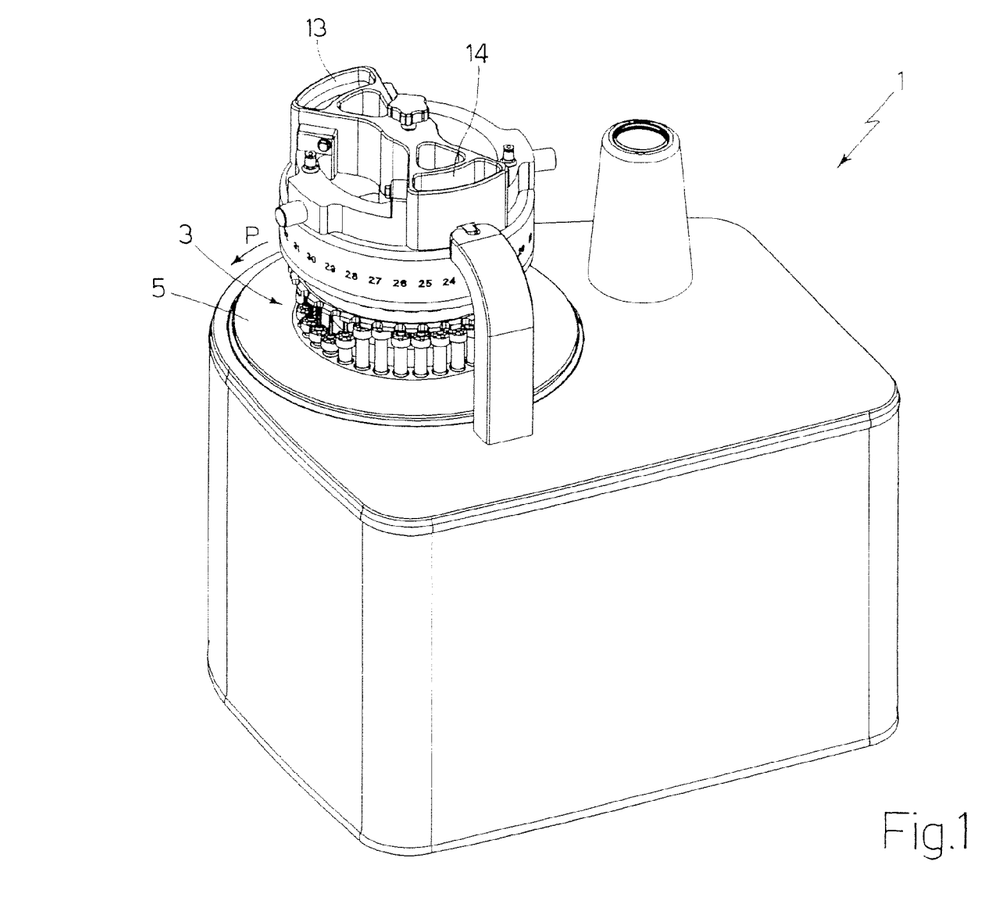
FIG. 1 shows a schematic view in perspective of a preferred embodiment of the machine according to the present invention.

Machine 1 comprises a metering wheel 3, in turn comprising a supporting shaft (not shown), which has a substantially vertical longitudinal axis 4, is connected to a fixed frame 5 of machine 1 to rotate continuously about axis 4 with respect to frame 5 and under the control of a known actuating device not shown, and supports a top metering drum 6.

Drum 6 comprises a bottom plate 7 perpendicular to axis 4 and connected in angularly fixed manner to the supporting shaft (not shown); and an annular top disk 8 fixed to a top edge of plate 7, coaxially with axis 4.

A sprocket 9 is formed on the outer surface of plate 7, is coaxial with axis 4, and forms part of a known conveyor device 10 for feeding each bottom shell 2 along a given path P. Device 10 comprises a chain conveyor 11 looped about a number of powered sprockets (of which only sprocket 9 is shown in FIG. 2a-2g) and having a number of pockets 12, which are substantially cup-shaped with their concavity facing upwards, are equally spaced along conveyor 11, are each designed to house a respective bottom shell 2 with its concavity facing upwards, and are fed continuously by conveyor 11 along path P.

In the example shown, two tubular containers 13, 14 (FIGS. 1 and 2b) are fixed to frame 5, are mounted on top of disk 8, are arranged about axis 4, each extend a respective given angle about axis 4, are axially open in a direction 15 parallel to axis 4, and each contain a respective pharmaceutical product in granules.

Drum 6 comprises a number of metering devices 16 equally spaced about axis 4 and fed continuously about axis 4 by wheel 3. Each device 16 is advanced by wheel 3 in time with a respective pocket 12 along a portion of path P to withdraw a given quantity of pharmaceutical product from each container 13, 14, and to feed the withdrawn pharmaceutical product into respective bottom shell 2.

Each device 16 comprises a cylindrical hole 17, which extends through plate 7 and disk 8, has a longitudinal axis 18 parallel to axis 4, is offset radially with respect to relative pocket 12, and comprises a wide top portion 19 and a narrow bottom portion 20.

Portion 19 houses a bush 21 mounted coaxially with axis 18 and having a capacitive transducer 22, which is integrated in bush 21, forms part of a weighing device 23 for weighing the product in each bottom shell 2, and is powered electrically by a connector 24 common to all of capacitive transducers 22. Connector 24 is mounted coaxially with axis 4, and comprises a fixed member 25 fitted to frame 5; and a movable member 26, which is fixed to wheel 3, is connected in rotary manner to member 25, and is connected electrically to capacitive transducers 22 of devices 16.

Bush 21, capacitive transducer 22, and weighing device 23 are described and illustrated in the Applicant's Patent Application WO-2006/035285-A2, the content of which forms an integral part of the present patent application.

Bush 21 laterally defines a substantially cylindrical metering chamber 27, which is connected to relative pocket 12 by an unloading chute 28 formed through disk 8, and is closed at the bottom by the top end of a piston 29, which is fitted through narrow bottom portion 20 of hole 17, coaxially with axis 18, and is fitted in axially sliding manner to drum 6 to move linearly in direction 15 with respect to drum 6 and under the control of an actuating device 30.

Piston 29 comprises an interchangeable top portion 29a, which is bounded at the top by a flat surface 31 sloping with respect to axis 18, is made of insulating material with little or no dielectric constant, is fitted removably to a bottom portion 29b of piston 29 made, for example, of metal, and is changeable, depending on the size of chamber 27.

Device 30 comprises a known cam 32, which extends about axis 4, is common to pistons 29 of all metering devices 16, and is engaged by a cam follower roller 33 of each piston 29. At each container 13, 14, cam 32 comprises a portion 34 (FIG. 2b) movable in direction 15 independently of the other portion 34 to selectively control the volume of chambers 27 at each container 13, 14.

Figure 2A:
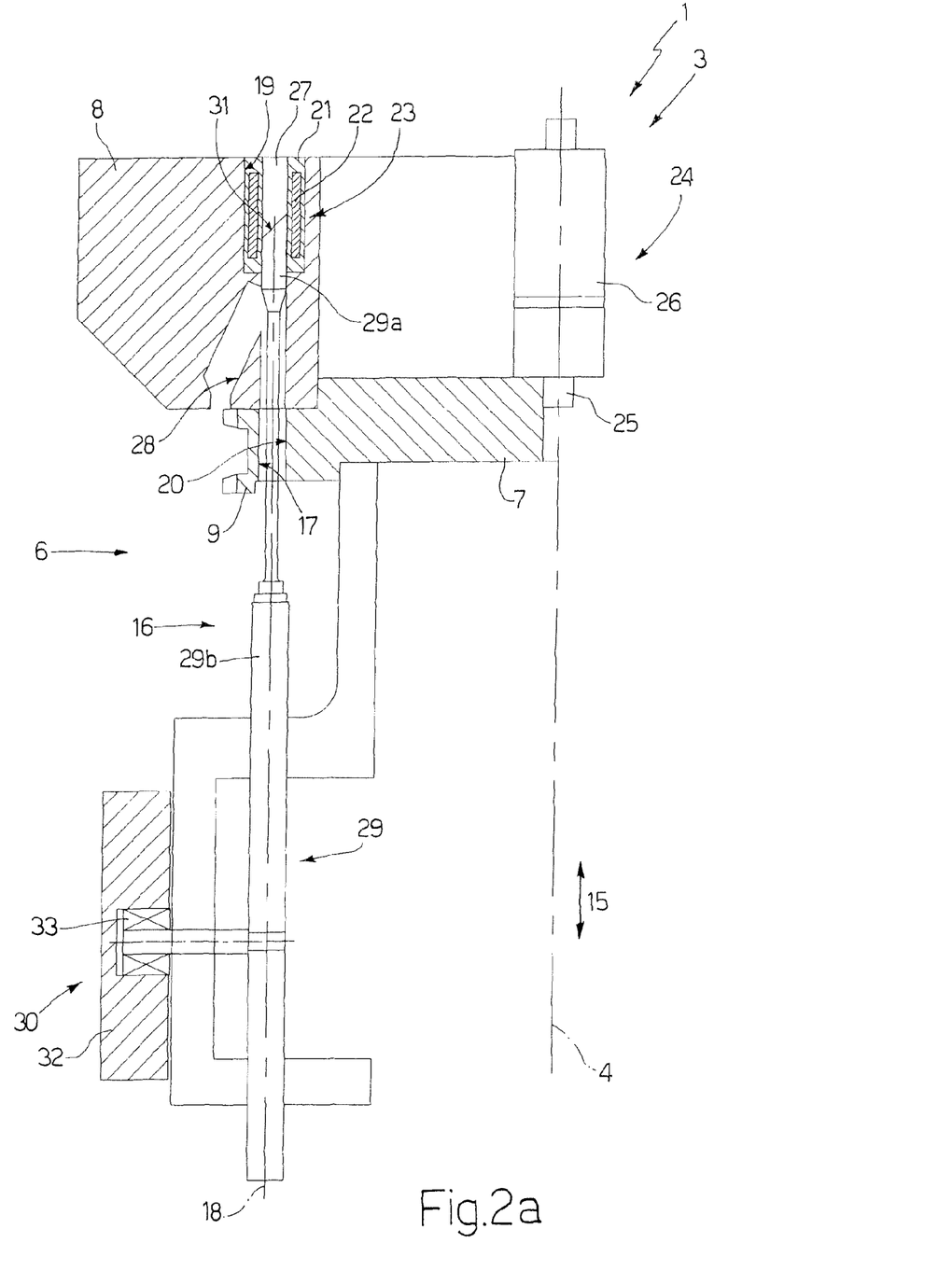
FIG. 2a-2g shows schematics of operation of the FIG. 1 machine.

Operation of machine 1 will now be described with reference to FIG. 2, assuming one bottom shell 2 is only filled with the pharmaceutical product from container 13, and as of the instant in which metering chamber 27 of relative metering device 16 is empty, and relative unloading chute 28 is closed by relative piston 29 (FIG. 2a).

As the metering device 16 considered travels between container 14 and container 13, piston 29 is lowered by cam 32 at constant speed in direction 15 to allow capacitive transducer 22 to weigh the portion of piston 29 projecting inside chamber 27 (FIG. 2a).

Figure 2B:
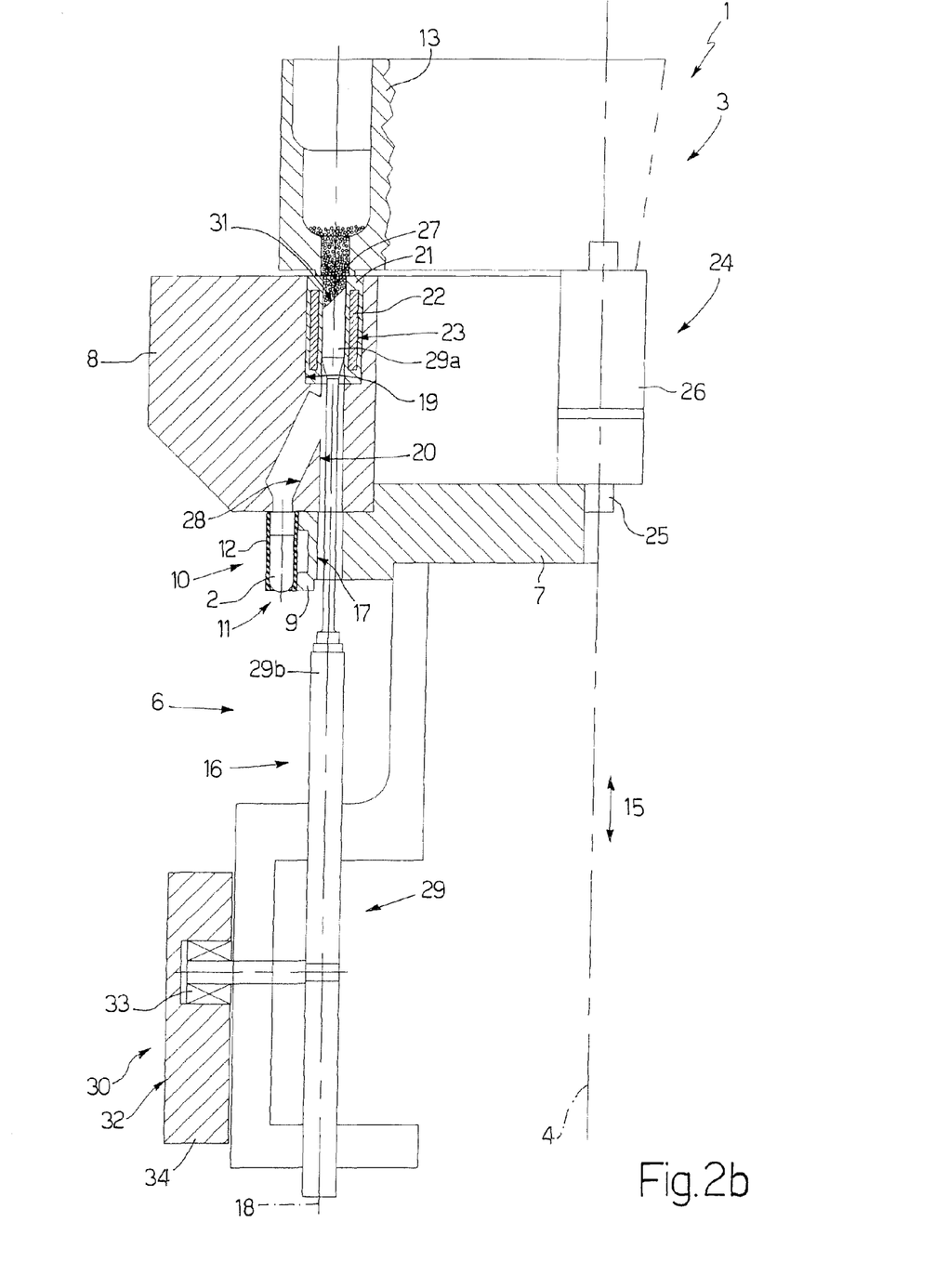
Figure 2C:
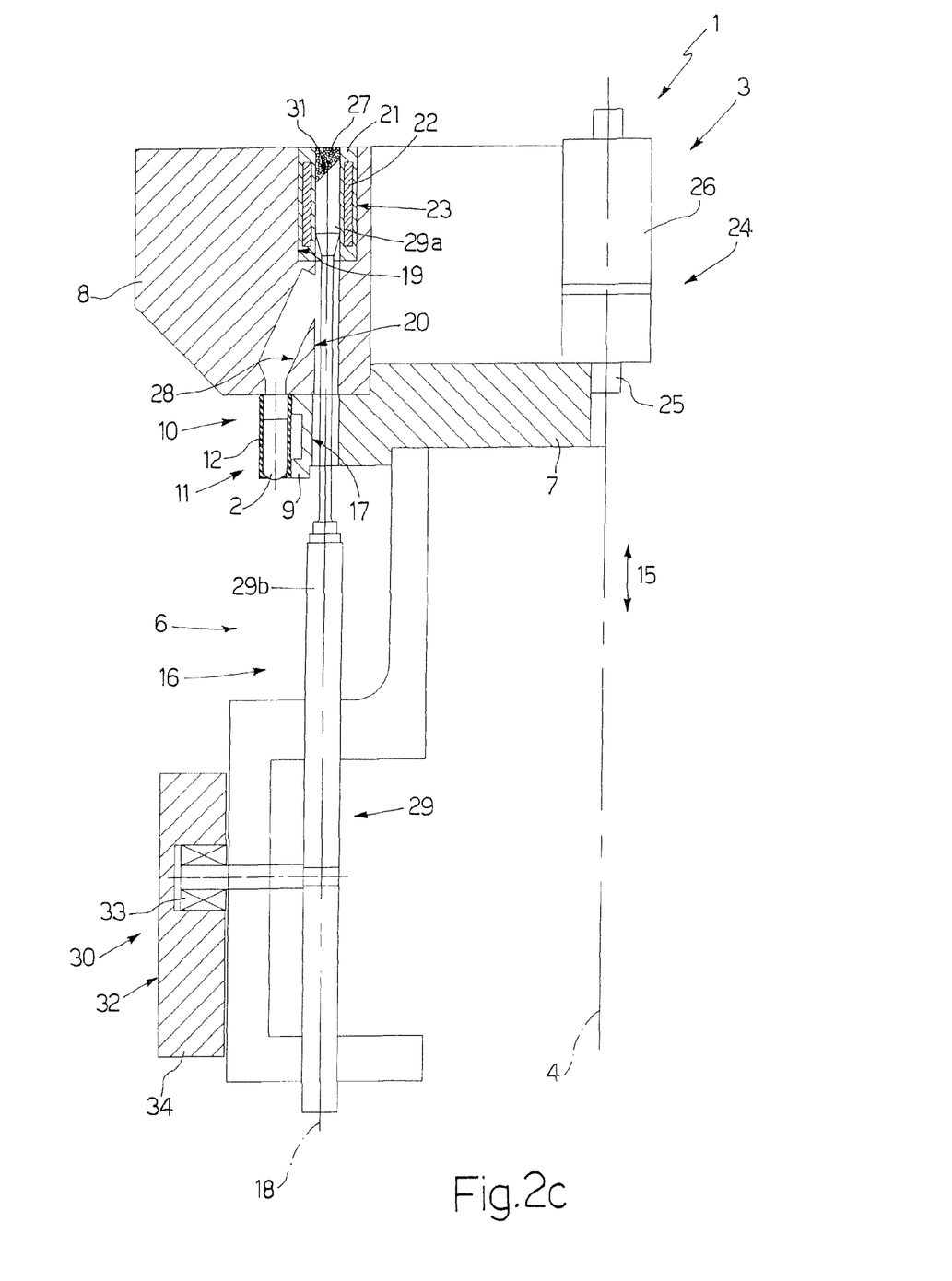

As shown in FIG. 2b, piston 29 is then raised in direction 15 into a position corresponding to a given volume of chamber 27, and bottom shell 2 and device 16 are fed, in time with each other, beneath container 13, so that a given quantity of pharmaceutical product drops by gravity from container 13 into chamber 27.

Figure 2D:
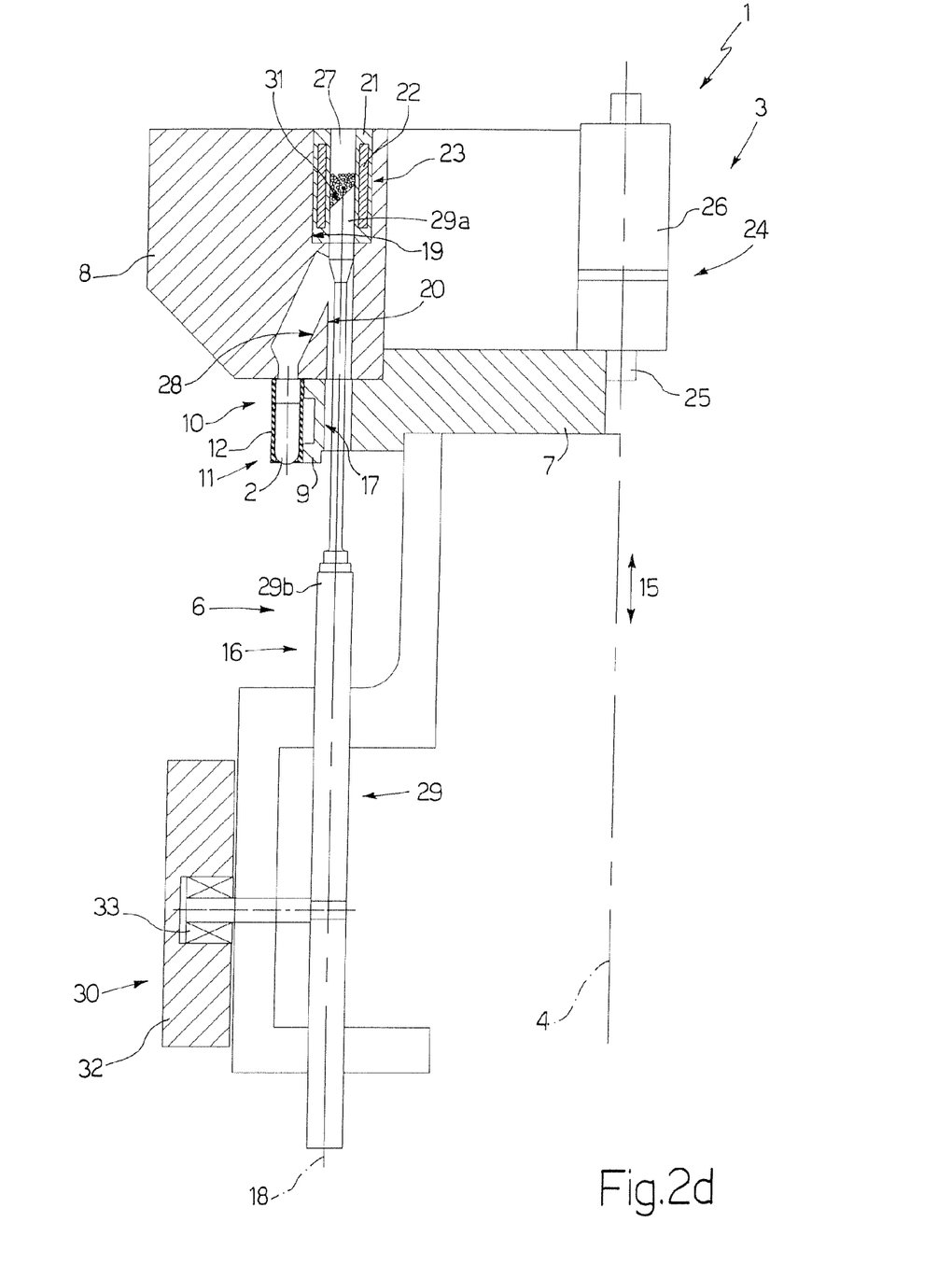
Figure 2E:
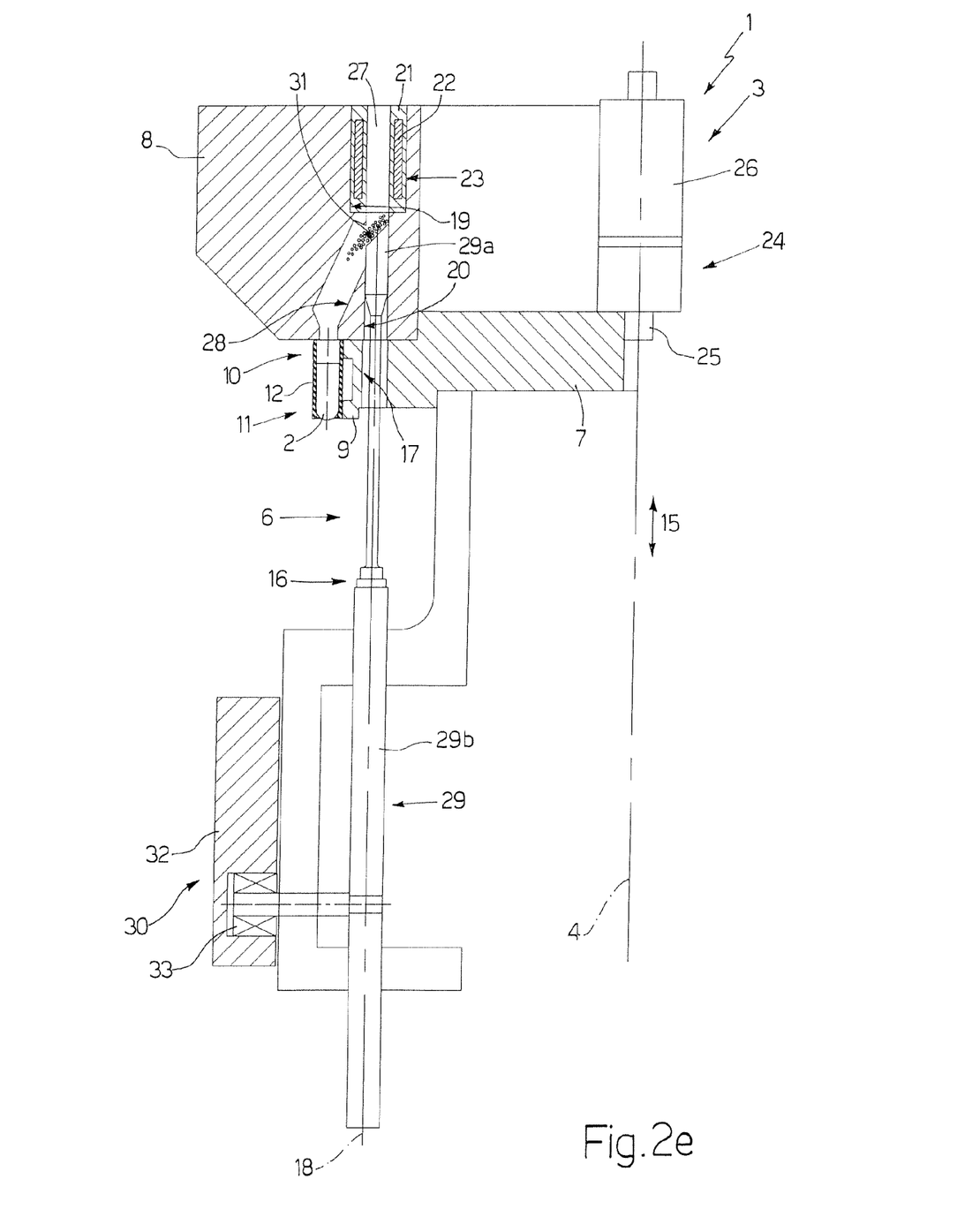
Figure 2F:
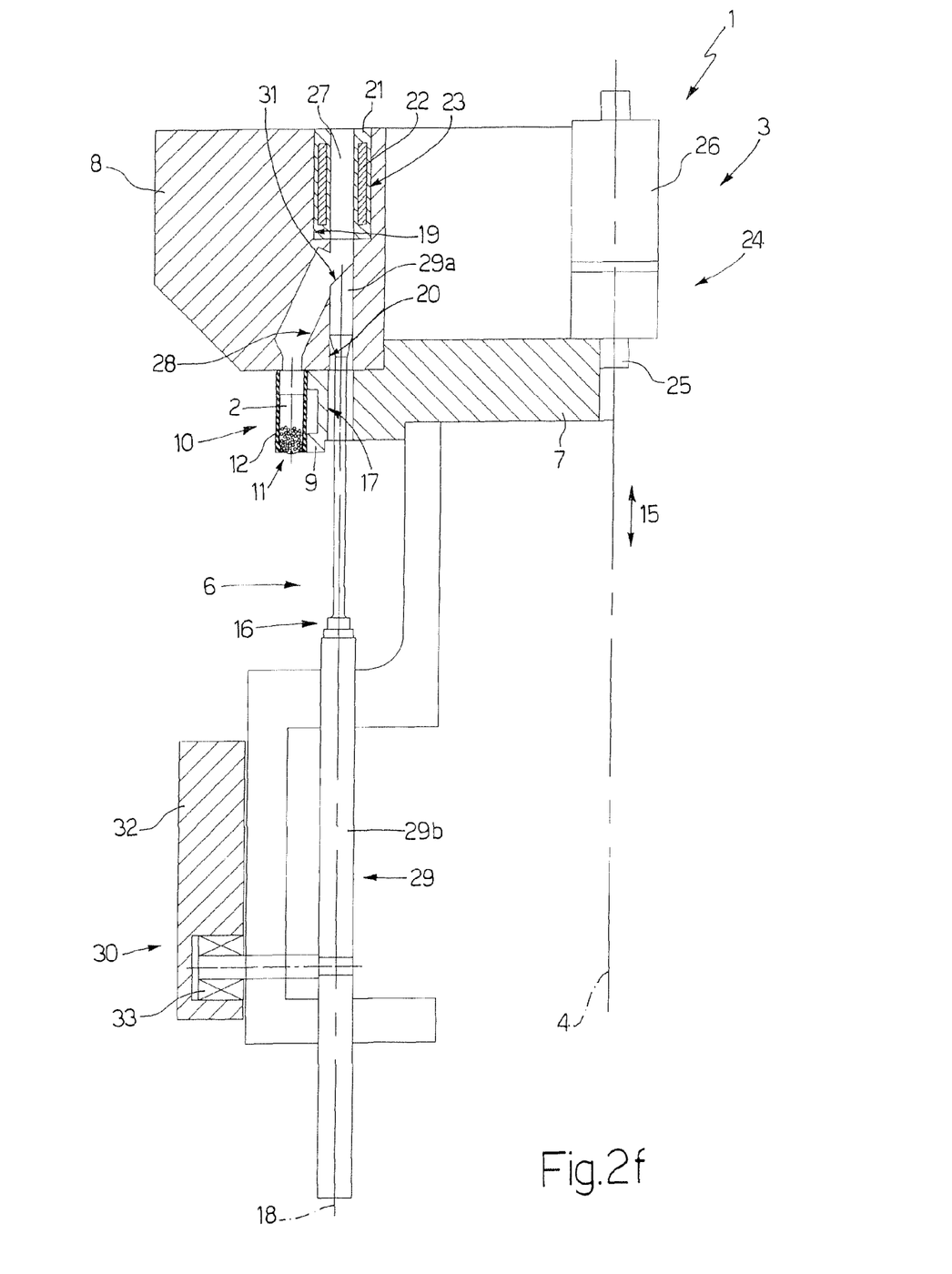

As metering wheel 3 rotates about axis 4, device 16 disengages container 13 (FIG. 2c), and piston 29 is lowered by cam 32, in the same way as described with reference to FIG. 2a, to allow the product to drop along chamber 27, and to allow capacitive transducer 22 to determine the total weight of the portion of piston 29 projecting inside chamber 27, and of the product in chamber 27 (FIG. 2d).

Since both weight measurements are made by moving piston 29 in direction 15 at the same speed and between the same positions along axis 18, the weight of the portion of piston 29 projecting inside chamber 27 has exactly the same effect in both measurements, so the weight of the product in chamber 27 can be calculated correctly by weighing device 23 as the difference between the two values recorded by capacitive transducer 22.

Figure 2G:
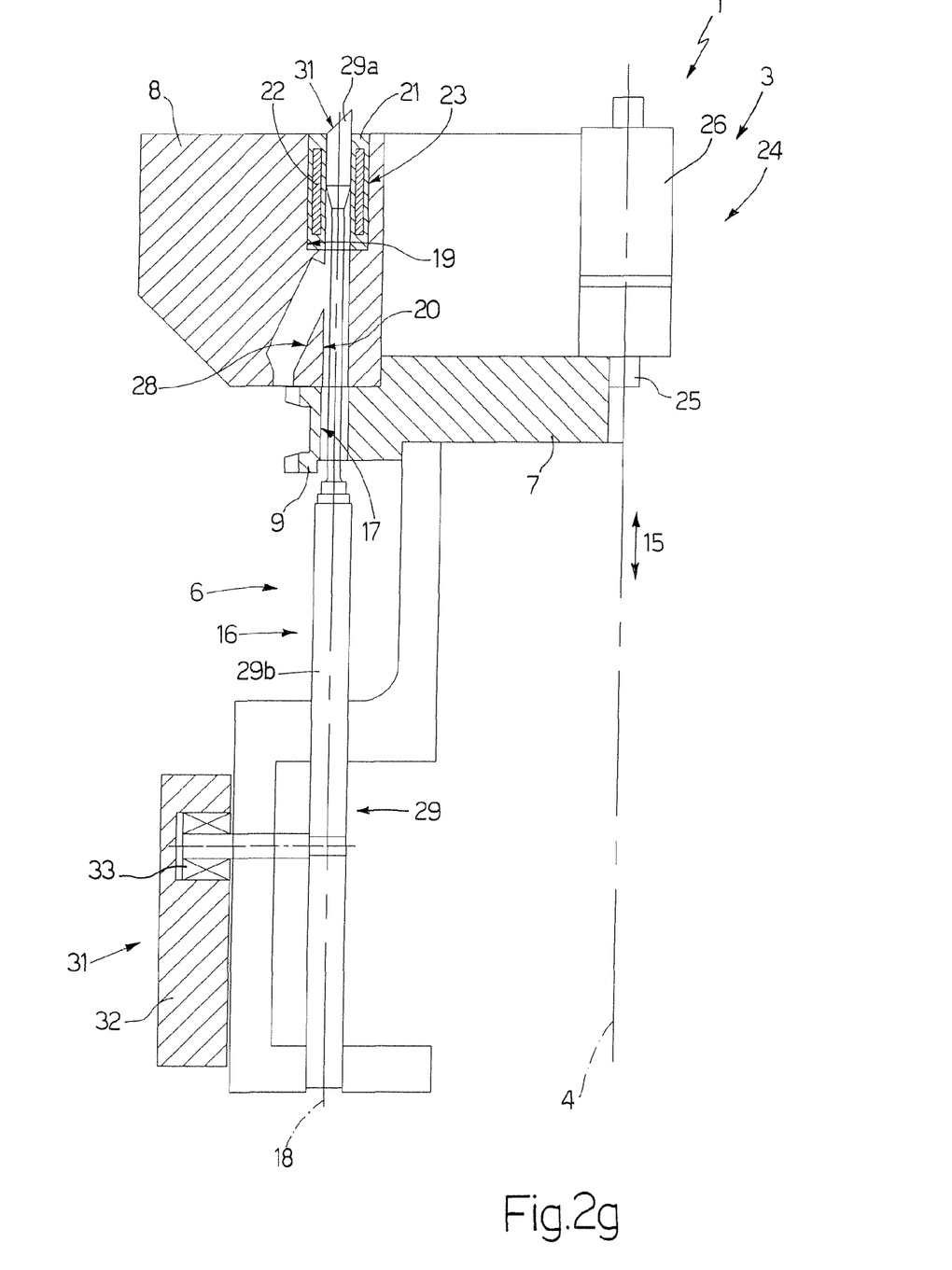

At this point, piston 29 is lowered in direction 15 into a position opening chamber 27 to allow the product to flow along unloading chute 28 into bottom shell 2 (FIGS. 2e and 2f), and, finally, is raised into a position projecting outwards of chamber 27 to expel any remaining granules from chamber 27 (FIG. 2g).

The above operating sequence described with reference to container 13 is obviously repeated for container 14 and, in the event of a number of metering wheels 3, for each container 13, 14 of each metering wheel 3.

Machine 1 has several advantages, mainly due to the fact that:

the product is weighed inside each metering chamber 27, i.e. before being fed into relative bottom shell 2, to prevent a possible error in the weight of bottom shell 2 from impairing calculation of the weight of the product in the bottom shell, particularly in view of the high dielectric constant of the material of bottom shell 2 with respect to the dielectric constant of the product inside bottom shell 2; and by weighing the product fed into each bottom shell from each container 13, 14 of each metering wheel 3, containers 13, 14 manifesting metering errors can be detected accurately, and the position of relative portion 34 of cam 32 corrected in direction 15.

The invention claimed is:

1. A machine for filling capsules with at least one product; each capsule comprising a bottom shell (2), and a top shell closing the bottom shell (2); the machine comprising conveying means (10) for feeding each bottom shell (2) continuously along a given path (P); at least one tank (13, 14) containing the product; at least one metering wheel (3) mounted to rotate continuously about a substantially vertical longitudinal axis (4); and a number of metering devices (16) movable with the metering wheel (3) along a portion of the path (P), in time with relative bottom shells (2), to feed the product into the relative bottom shells (2); each metering device (16) comprising a metering chamber (27) for receiving a given quantity of product from the tank (13, 14), and feed means (29) for transferring the product from the metering chamber (27) into the relative bottom shell (2); and the machine being characterized in that each metering chamber (27) comprises a respective weighing device (22) for weighing the product contained in the metering chamber (27).

2. A machine as claimed in claim 1, wherein the weighing device (22) comprises at least one capacitive transducer (22).

3. A machine as claimed in claim 1, wherein the weighing device (22) comprises a bush (21) at least partly defining said metering chamber (27).

4. A machine as claimed in claim 3, wherein the bush (21) has at least one capacitive transducer (22).

5. A machine as claimed in claim 1, wherein each metering device (16) also comprises an unloading chute (28) for unloading the product from the metering chamber (27) into the relative bottom shell (2); and a piston (29), which defines the bottom of the metering chamber (27), and is movable along the metering chamber (27), in a direction (15) substantially parallel to said axis (4), to and from a feed position to feed the product onto the unloading chute (28).

6. A machine as claimed in claim 5, and also comprising actuating means (30) for moving the piston (29) in said direction (15) to and from said feed position; the actuating means (30) comprising a cam (32) extending about said axis (4), and, for each piston (29), at least one cam follower (33) cooperating with the cam (32).

7. A machine as claimed in claim 6, wherein, at least at the tank (13, 14), the cam (32) comprises a movable portion (34) movable in said direction (15) to selectively control a volume of the metering chambers (27).

8. A machine as claimed in claim 6, and comprising, for each metering wheel (3), at least two tanks (13, 14) containing at least one product; the cam (32) comprising, at each tank (13, 14), a movable portion (34) movable in said direction (15) independently of the other movable portions (34) to selectively control a volume of the metering chambers (27) at each tank (13, 14).

9. A method of filling capsules with at least one product; each capsule comprising a bottom shell (2), and a top shell closing the bottom shell (2); the method comprising the steps of:
feeding the bottom shells (2) continuously along a given path (P);
feeding a number of metering devices (16) of at least one metering wheel (3) along a portion of the path (P) in time with relative bottom shells (2);
transferring a given quantity of product from at least one tank (13, 14) into a metering chamber (27) of each metering device (16); and
transferring the product from each metering chamber (27) into the relative bottom shell (2);
and being characterized by also comprising the step of:
weighing the product in each metering chamber (27) inside the metering chamber (27) itself.

10. A method as claimed in claim 9, wherein the product in each metering chamber (27) is weighed by means of at least one capacitive transducer (22).

11. A method as claimed in claim 9, wherein the product in each metering chamber (27) is weighed inside a bush (21) at least partly defining the metering chamber (27).

12. A method as claimed in claim 11, wherein the bush (21) has at least one capacitive transducer (22).

13. A method as claimed in claim 9, and comprising, in succession, in the following order, and for each metering chamber (27), the steps of:
closing the bottom of the metering chamber (27) by means of a piston (29);
transferring a given quantity of product from the tank (13, 14) into the metering chamber (27);
weighing the product contained in the metering chamber (27); and
moving the piston (29) into a feed position to feed the product from the metering chamber (27) into the relative bottom shell (2).

14. A method as claimed in claim 13, wherein the pistons (29) are moved to and from the respective said feed positions by respective cam followers (33) engaging at least one cam (32).

15. A method as claimed in claim 14, and also comprising the step of:
moving at least one movable portion (34) of the cam (32), located at the tank (13, 14), in a given direction (15) to selectively control a volume of the metering chambers (27).

16. A method as claimed in claim 14, wherein each metering wheel (3) comprises at least two tanks (13, 14) containing at least one product; the method also comprising the step of:
moving at least one movable portion (34) of the cam (32), located at each tank (13, 14), in a given direction (15) and independently of the other movable portions (34), to selectively control a volume of the metering chambers (27) at each tank (13, 14).

17. A method as claimed in claim 9, and comprising, in succession, in the following order, and for each metering chamber (27), the steps of:
closing the bottom of the metering chamber (27) by means of a piston (29);
determining the weight of a portion of the piston (29) projecting inside the metering chamber (27);
transferring a given quantity of product from the tank (13, 14) into the metering chamber (27);
determining the total weight of the portion of the piston (29) projecting inside the metering chamber (27), and of the product contained in the metering chamber (27); and
calculating the weight of the product contained in the metering chamber (27) as the difference between the two weights.

* * * * *